United States Patent
Kariyama et al.

(10) Patent No.: US 9,453,546 B2
(45) Date of Patent: Sep. 27, 2016

(54) BICYCLE BRAKING SYSTEM

(71) Applicant: SHIMANO INC., Sakai (JP)

(72) Inventors: Osamu Kariyama, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/472,316

(22) Filed: Aug. 28, 2014

(65) Prior Publication Data

US 2016/0061279 A1 Mar. 3, 2016

(51) Int. Cl.
| | |
|---|---|
| *F16D 65/72* | (2006.01) |
| *F16D 55/224* | (2006.01) |
| *B62L 3/02* | (2006.01) |
| *B60T 7/08* | (2006.01) |
| *B60T 13/74* | (2006.01) |
| *B62L 1/16* | (2006.01) |

(52) U.S. Cl.
CPC .............. *F16D 65/72* (2013.01); *B60T 7/085* (2013.01); *B60T 13/745* (2013.01); *B62L 1/16* (2013.01); *B62L 3/023* (2013.01); *F16D 55/2245* (2013.01); *B62K 2207/00* (2013.01)

(58) Field of Classification Search
None
See application file for complete search history.

(56) References Cited

U.S. PATENT DOCUMENTS

| | | | | |
|---|---|---|---|---|
| 4,921,081 | A * | 5/1990 | Chilcote | B62L 3/023 188/344 |
| 5,813,501 | A * | 9/1998 | Terry, Sr. | B60T 11/165 188/24.11 |
| 5,887,683 | A * | 3/1999 | Yamashita | B62L 1/00 188/24.19 |
| 6,042,495 | A * | 3/2000 | Patterson | B62M 9/122 474/78 |
| 2002/0166734 | A1* | 11/2002 | Lumpkin | B60T 11/046 188/24.22 |
| 2004/0011598 | A1* | 1/2004 | Hermansen | B62L 1/005 188/24.21 |
| 2005/0029858 | A1* | 2/2005 | Forster | B60T 13/741 303/20 |
| 2007/0114838 | A1* | 5/2007 | Bitz | B60T 8/4081 303/11 |
| 2007/0235268 | A1* | 10/2007 | Caron | B60T 17/221 188/71.8 |
| 2008/0111342 | A1* | 5/2008 | Niekerk | B60T 8/1706 280/261 |
| 2008/0245632 | A1* | 10/2008 | Watarai | B62L 3/023 188/344 |
| 2009/0183958 | A1* | 7/2009 | Sano | B60T 8/00 188/204 R |
| 2010/0181137 | A1* | 7/2010 | Ishida | F16D 13/52 180/293 |
| 2013/0333994 | A1* | 12/2013 | Jordan | B62L 3/02 188/344 |
| 2014/0041971 | A1* | 2/2014 | Hujer | B62L 1/16 188/72.7 |
| 2014/0069750 | A1* | 3/2014 | Nohira | B60T 13/741 188/71.8 |
| 2014/0231186 | A1* | 8/2014 | Wu | B62L 1/14 188/24.19 |
| 2015/0047929 | A1* | 2/2015 | Narula | B60T 13/741 188/71.8 |

FOREIGN PATENT DOCUMENTS

| | | |
|---|---|---|
| DE | 4439016 | 7/1996 |
| DE | 10 2010 038 525 | 2/2012 |

* cited by examiner

*Primary Examiner* — Krishnan Ramesh
(74) *Attorney, Agent, or Firm* — Mori & Ward, LLP

(57) ABSTRACT

A bicycle braking system comprises an operating device, a braking device, a sensing device, and an adjusting device. The operating device includes an operating member configured to be operated by a user. The braking device is configured to apply a braking force to a movable member of a bicycle in response to an operation of the operating member. The braking device includes at least one friction member configured to contact the movable member. The sensing device is configured to sense first information relating to an operation amount of the operating member and second information relating to an operating force of the operating member. The adjusting device is configured to adjust a position of the at least one friction member based on the first information and the second information.

19 Claims, 14 Drawing Sheets

BICYCLE BRAKING SYSTEM

BACKGROUND OF THE INVENTION

1. Field of the Invention

The present invention relates to a bicycle braking system.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a braking system.

The braking system includes an operation apparatus and a braking apparatus. The braking apparatus includes a friction element to apply a braking force to a sliding element such as a wheel or a disc brake rotor. The friction element is worn away due to sliding with the sliding element.

SUMMARY OF THE INVENTION

In accordance with a first aspect of the present invention, a bicycle braking system comprises an operating device, a braking device, a sensing device, and an adjusting device. The operating device includes an operating member configured to be operated by a user. The braking device is configured to apply a braking force to a movable member of a bicycle in response to an operation of the operating member. The braking device includes at least one friction member configured to contact the movable member. The sensing device is configured to sense first information relating to an operation amount of the operating member and second information relating to an operating force of the operating member. The adjusting device is configured to adjust a position of the at least one friction member based on the first information and the second information.

In accordance with a second aspect of the present invention, the bicycle braking system according to the first aspect is configured so that the adjusting device includes an actuator and an adjustment controller. The actuator is configured to actuate the braking device to move the at least one friction member. The adjustment controller is configured to control the actuator to move the at least one friction member based on the first information and the second information.

In accordance with a third aspect of the present invention, the bicycle braking system according to the second aspect is configured so that the braking device includes a transmitting member configured to transmit the operating force from the operating member to the at least one friction member. The at least one friction member is movable from a rest position toward the movable member in response to the operating force transmitted by the transmitting member. The actuator is configured to move the transmitting member to change the rest position of the at least one friction member.

In accordance with a fourth aspect of the present invention, the bicycle braking system according to the third aspect is configured so that the braking device includes a slave cylinder and a slave piston movably provided in the slave cylinder. The transmitting member is coupled to the slave piston to move together with the slave piston relative to the slave cylinder.

In accordance with a fifth aspect of the present invention, the bicycle braking system according to the second aspect is configured so that the adjustment controller includes a clearance-value obtaining part configured to obtain a comparing value relating to a clearance between the at least one friction member and the movable member based on the first information and the second information.

In accordance with a sixth aspect of the present invention, the bicycle braking system according to the fifth aspect is configured so that the adjustment controller is configured to compare the comparing value with a reference value. The adjustment controller is configured to control the actuator to move the at least one friction member based on a comparison between the comparing value and the reference value.

In accordance with a seventh aspect of the present invention, the bicycle braking system according to the sixth aspect is configured so that the adjustment controller is configured to store first to N1-th latest comparing values, wherein N1 is an integer equal to or larger than 2. The adjustment controller is configured to calculate, as the comparing value, an average value of the first to N1-th latest comparing values. The adjustment controller is configured to control the actuator to adjust the clearance between the at least one friction member and the movable member in a case where the comparing value is larger than the reference value by a reference differential value or more.

In accordance with an eighth aspect of the present invention, the bicycle braking system according to the sixth aspect is configured so that the adjustment controller is configured to obtain the reference value based on the first information and the second information in a setting mode.

In accordance with a ninth aspect of the present invention, the bicycle braking system according to the eighth aspect is configured so that the adjustment controller is configured to store first to N2-th latest comparing values, in the setting mode, wherein N2 is an integer equal to or larger than 2. The adjustment controller is configured to calculate, as the reference value, an average value of the first to N2-th latest comparing values in the setting mode.

In accordance with a tenth aspect of the present invention, the bicycle braking system according to the first aspect is configured so that the operating device includes a main body configured to pivotally support the operating member. The sensing device includes a first sensor configured to sense, as the first information, an operation angle of the operating member relative to the main body.

In accordance with an eleventh aspect of the present invention, the bicycle braking system according to the first aspect is configured so that the sensing device includes a second sensor configured to sense, as the second information, an operating force applied from the operating member to the braking device.

In accordance with a twelfth aspect of the present invention, the bicycle braking system according to the eleventh aspect further comprises a hydraulic hose configured to hydraulically couple the operating device to the braking device. The operating device includes a master cylinder and a master piston. The master piston is movably provided in the master cylinder to define a master chamber configured to generate, as the operating force, a hydraulic pressure in response to an operation of the operating member. The braking device includes a slave cylinder and a slave piston. The slave piston is movably provided in the slave cylinder to define a slave chamber configured to be connected with the master chamber via the hydraulic hose.

In accordance with a thirteenth aspect of the present invention, the bicycle braking system according to the twelfth aspect is configured so that the second sensor is configured to sense the hydraulic pressure as the second information.

In accordance with a fourteenth aspect of the present invention, the bicycle braking system according to the first aspect is configured so that the braking device includes, as the at least one friction member, a first friction member and a second friction member which are configured to sandwich the movable member between the first friction member and the second friction member to apply the braking force to the movable member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
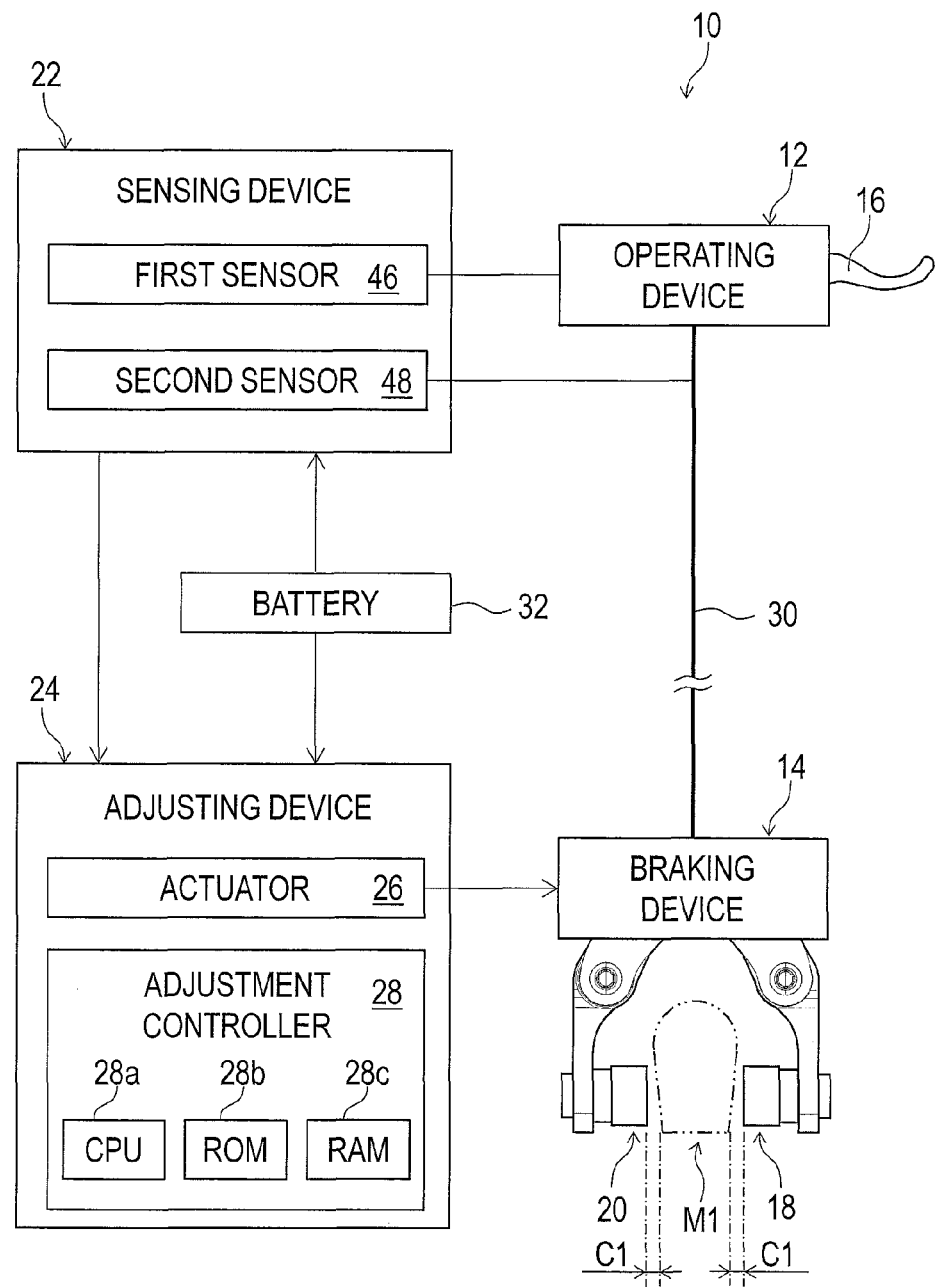
FIG. 1 is a schematic block diagram of a bicycle braking system in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle braking system 10 in accordance with a first embodiment comprises an operating device 12 and a braking device 14.

The operating device 12 includes an operating member 16 configured to be operated by a user. In the illustrated embodiment, for example, the operating device 12 is a hydraulic operating device and is configured to be mounted on a handlebar (not shown).

The braking device 14 is configured to apply a braking force to a movable member M1 of a bicycle in response to an operation of the operating member 16. In the illustrated embodiment, the movable member M1 is a wheel having a rim. Possible examples of the movable member M1 include a wheel and a disc brake rotor rotatable together with a wheel. The braking device 14 is configured to be mounted on a bicycle frame (not shown), for example.

As seen in FIG. 1, the braking device 14 includes at least one friction member configured to contact the movable member M1. In the illustrated embodiment, the braking device 14 includes, as the at least one friction member, a first friction member 18 and a second friction member 20 which are configured to sandwich the movable member M1 between the first friction member 18 and the second friction member 20 to apply the braking force to the movable member M1. While the braking device 14 includes the first friction member 18 and the second friction member 20, the braking device 14 can include at least one friction member such as the first friction member 18 or the second friction member 20.

The first friction member 18 and the second friction member 20 are worn away due to sliding with respect to the movable member M1. The wear of each of the first friction member 18 and the second friction member 20 increases a clearance C1 between the movable member M1 and each of the first friction member 18 and the second friction member 20. This reduces response of the bicycle braking system 10.

To keep quick response of the braking device 14, as seen in FIG. 1, the bicycle braking system 10 comprises a sensing device 22 and an adjusting device 24. The sensing device 22 is configured to sense first information and second information. The first information relates to an operation amount of the operating member 16. The second information relates to an operating force of the operating member 16. The sensing device 22 is electrically connected to the adjusting device 24. The sensing device 22 is configured to output the first information and the second information to the adjusting device 24.

As seen in FIG. 1, the adjusting device 24 is configured to adjust a position of the at least one friction member based on the first information and the second information. The adjusting device 24 is configured to adjust the clearance C1 between the movable member M1 and each of the first friction member 18 and the second friction member 20 based on the first information and the second information. The adjusting device 24 includes an actuator 26 and an adjustment controller 28.

The actuator 26 is configured to actuate the braking device 14 to move the at least one friction member 18 and/or 20. For example, the actuator 26 includes a motor such as a stepper motor, a servo motor, or a direct current motor. In the illustrated embodiment, the actuator 26 will be described as the stepper motor. The actuator 26 can be an actuator other than a motor if needed and/or desired.

The adjustment controller 28 is configured to control the actuator 26 to move the at least one friction member 18 and/or 20 based on the first information and the second information. In the illustrated embodiment, the adjustment controller 28 is configured to control the actuator 26 to move the first friction member 18 and the second friction member 20 based on the first information and the second information. More specifically, the adjustment controller 28 is configured to control the actuator 26 to adjust the clearance C1 between the movable member M1 and each of the first friction member 18 and the second friction member 20 based on the first information and the second information. The adjustment controller 28 is configured to generate driving signals to control an amount of output rotation of the actuator 26 and a rotational direction of the actuator 26.

The adjustment controller 28 is constituted as a processor. The adjustment controller 28 includes a central processing unit (CPU) 28a, a read only memory (ROM) 28b, and a random access memory (RAM) 28c. For example, a program stored in the ROM 28b is read into the CPU 28a, and thereby various functions of the adjustment controller 28 are performed.

As seen in FIG. 1, the bicycle braking system 10 further comprises a hydraulic hose 30 configured to hydraulically couple the operating device 12 to the braking device 14. The sensing device 22 is connected to the hydraulic hose 30 to sense the second information. The sensing device 22 can be connected to the operating device 12 or the braking device 14 to sense the second information if needed and/or desired.

The bicycle braking system 10 further comprises a battery 32 configured to supply electric power to the sensing device 22 and the adjusting device 24. The sensing device 22, the adjustment controller 28 of the adjusting device 24, and the battery 32 are mounted on the bicycle frame (not shown), for example.

Figure 2:
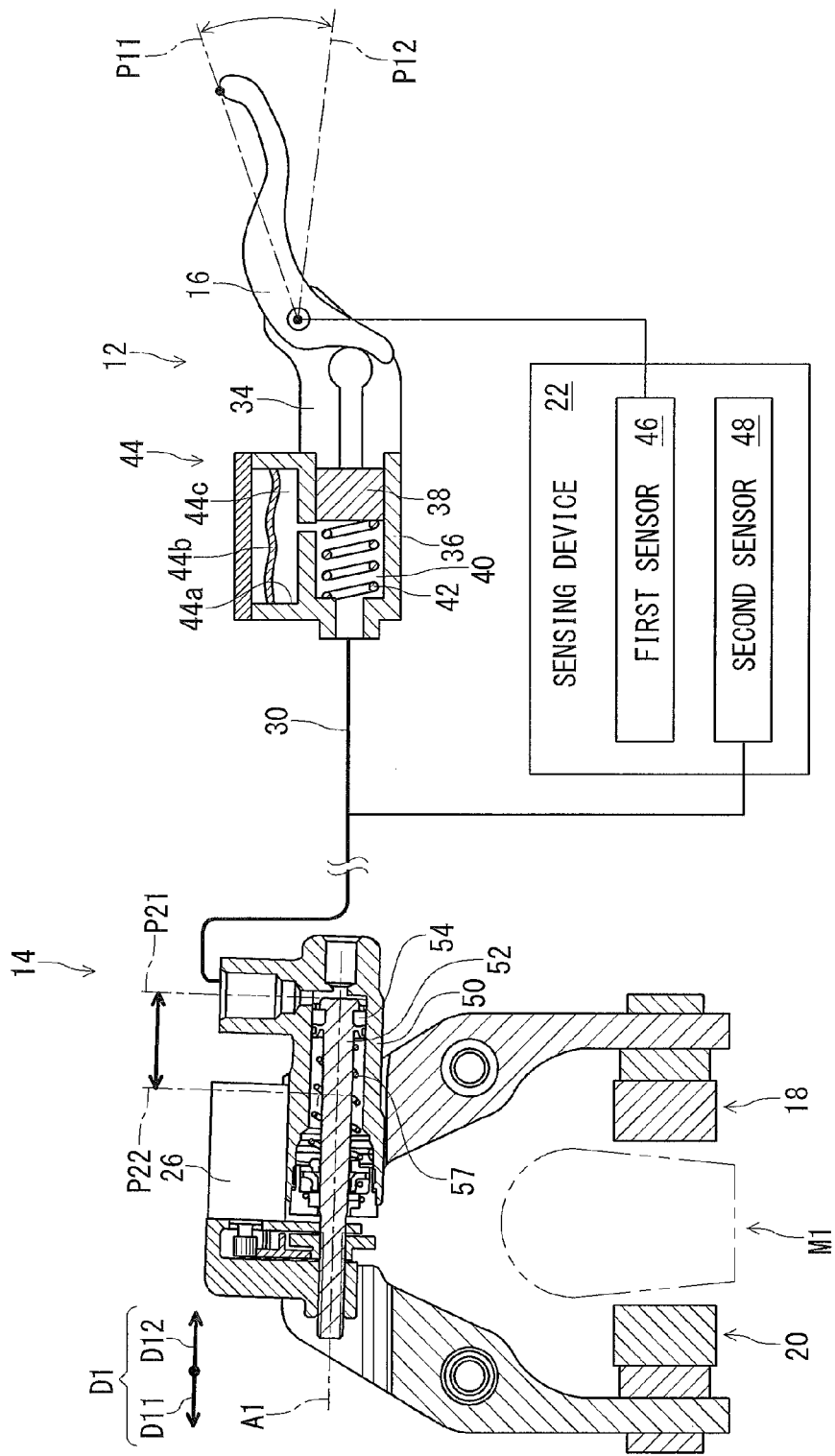
FIG. 2 is a partial schematic block diagram of a bicycle braking system illustrated in FIG. 1.

As seen in FIG. 2, the operating device 12 includes a main body 34 configured to pivotally support the operating member 16. The operating member 16 is pivotable relative to the main body 34 between a rest position P11 and an operated position P12.

In the present application, the term "rest position" as used herein refers to a position at which a movable part such as the operating member 16 remains stationary in a state where the movable part is not operated by the user. The term "operated position" as used herein refers to a position at which the movable part has been operated by the user to perform operation of a bicycle component such as the braking device 14.

The operating device 12 includes a master cylinder 36 and a master piston 38. The master cylinder 36 is provided on the main body 34. The master piston 38 is movably provided in the master cylinder 36 to define a master chamber 40 configured to generate, as the operating force, a hydraulic pressure in response to an operation of the operating member 16. The operating member 16 is operatively connected to the master piston 38. The hydraulic pressure generated by the master piston 38 is transmitted from the operating device 12 to the braking device 14 via the hydraulic hose 30.

The operating device 12 includes a master biasing member 42 and a reservoir tank 44. The master biasing member 42 is provided in the master chamber 40 to bias the master piston 38. The master biasing member 42 is configured to bias the operating member 16 via the master piston 38 toward the rest position P11.

The reservoir tank 44 is configured to be in fluid communication with the master chamber 40. The reservoir tank 44 includes a fluid reservoir 44a and a flexible diaphragm 44b. The flexible diaphragm 44b is disposed in the fluid reservoir 44a to define a fluid chamber 44c configured to be in fluid communication with the master chamber 40. The flexible diaphragm 44b is configured to change an interior volume of the fluid chamber 44c in response to the hydraulic pressure of the master chamber 40.

As seen in FIG. 2, the sensing device 22 includes a first sensor 46 configured to sense, as the first information, an operation angle of the operating member 16 relative to the main body 34. For example, the first sensor 46 is configured to sense an absolute angular position of the operating member 16 relative to the main body 34. Accordingly, it can be said that the first sensor 46 is configured to obtain angular positions of the operating member 16 to sense the operation angle of the operating member 16 relative to the main body 34. Possible examples of the first sensor 46 include a rotary encoder. The first sensor 46 can be mounted on the operating device 12.

The sensing device 22 includes a second sensor 48 configured to sense, as the second information, an operating force applied from the operating member 16 to the braking device 14. For example, the second sensor 48 is configured to sense the hydraulic pressure of the master chamber 40 as the second information. More specifically, the second sensor 48 is configured to sense the hydraulic pressure in the hydraulic hose 30. The second sensor 48 is configured to be connected to the hydraulic hose 30. Possible examples of the second sensor 48 include an oil pressure sensor.

The braking device 14 includes a slave cylinder 50 and a slave piston 52 movably provided in the slave cylinder 50. More specifically, the slave piston 52 is movably provided in the slave cylinder 50 to define a slave chamber 54 configured to be connected with the master chamber 40 via the hydraulic hose 30. The slave piston 52 has a center axis A1 and is movable relative to the slave cylinder 50 in an axial direction D1 parallel to the center axis A1. The slave piston 52 is movable relative to the slave cylinder 50 in the axial direction D1 between a rest position P21 and an actuated position P22.

As seen in FIG. 2, the rest position P21 of the slave piston 52 corresponds to the rest position P11 of the operating member 16. The actuated position P22 of the slave piston 52 corresponds to the operated position P12 of the operating member 16. When the operating member 16 is operated by a user from the rest position P11 toward the operated position P12, the hydraulic pressure increases in the master chamber 40, the hydraulic hose 30, and the slave cylinder 50. This causes hydraulic fluid to flow from the master chamber 40 into the slave chamber 54 via the hydraulic hose 30, moving the slave piston 52 in the slave cylinder 50 from the rest position P21 to the actuated position P22 in a first axial direction D11. When the operating member 16 is returned to the rest position P11 by the biasing force of the master biasing member 42, the slave piston 52 is moved to the rest position P21 relative to the slave cylinder 50 in a second axial direction D12 opposite to the first axial direction D11.

Figure 3:
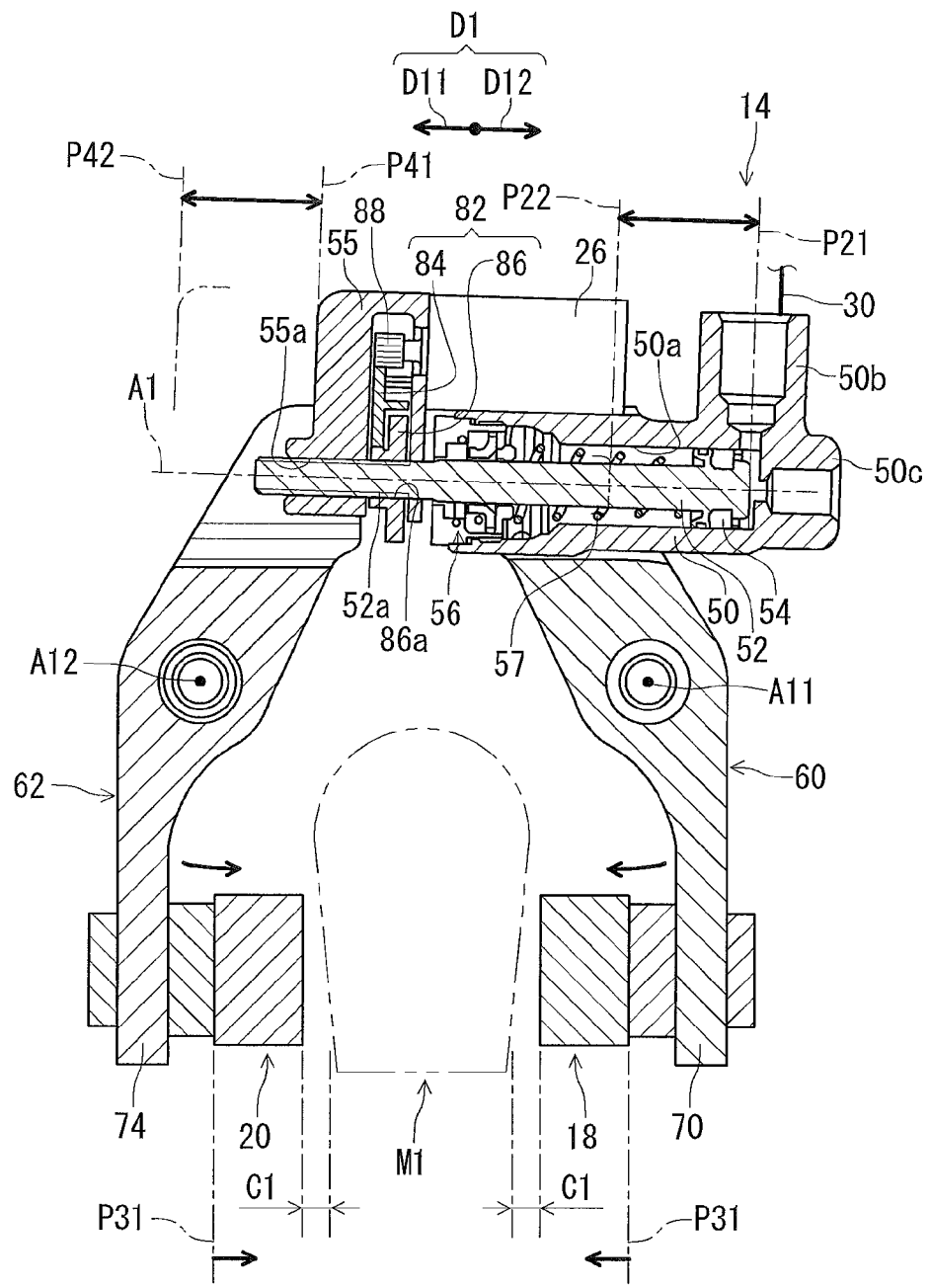
FIG. 3 is a cross-sectional view of a braking device of the bicycle braking system illustrated in FIG. 1.

As seen in FIG. 3, the slave cylinder 50 includes a cylinder bore 50a, an inlet port 50b, and a bleed port 50c. The slave piston 52 is movably provided in the cylinder bore 50a to define the slave chamber 54. The inlet port 50b and the bleed port 50c are in communication with the slave chamber 54. The inlet port 50b is configured to be connected to the hydraulic hose 30 via a banjo and a banjo bolt (not shown). A bleed nipple or a bleed plug (not shown) is attached to the bleed port 50c.

As seen in FIG. 3, the braking device 14 includes a transmitting member 55 configured to transmit the operating force from the operating member 16 to the at least one friction member 18 and/or 20. The at least one friction member 18 and/or 20 is movable from a rest position P31 toward the movable member M1 in response to the operating force transmitted by the transmitting member 55. The actuator 26 is configured to move the transmitting member 55 to change the rest position P31 of the at least one friction member 18 and/or 20.

In the illustrated embodiment, each of the first friction member 18 and the second friction member 20 is movable from the rest position P31 toward the movable member M1 in response to the operating force transmitted by the transmitting member 55. The actuator 26 is configured to move the transmitting member 55 to change the rest position P31 of each of the first friction member 18 and the second friction member 20.

The rest position P31 of each of the first friction member 18 and the second friction member 20 is defined by a portion which does not contact the movable member M1 in each of the first friction member 18 and the second friction member 20. Namely, the rest position P31 is not affected by the wear of each of the first friction member 18 and the second friction member 20.

As seen in FIG. 3, the transmitting member 55 is coupled to the slave piston 52 to move together with the slave piston 52 relative to the slave cylinder 50. The braking device 14 includes a piston support part 56 and a return biasing member 57. The piston support part 56 is attached to the slave cylinder 50 to movably support the slave piston 52 in the axial direction D1.

The return biasing member 57 is configured to bias the slave piston 52 toward the rest position P21. Namely, the transmitting member 55 is biased by the return biasing member 57 toward a rest position P41 corresponding to the rest position P21 of the slave piston 52. When the slave piston 52 moves toward the actuated position P22 relative to the slave cylinder 50 in the first axial direction D11, the transmitting member 55 moves toward an actuated position P42 relative to the slave cylinder 50 in the first axial direction D11.

Figure 4:
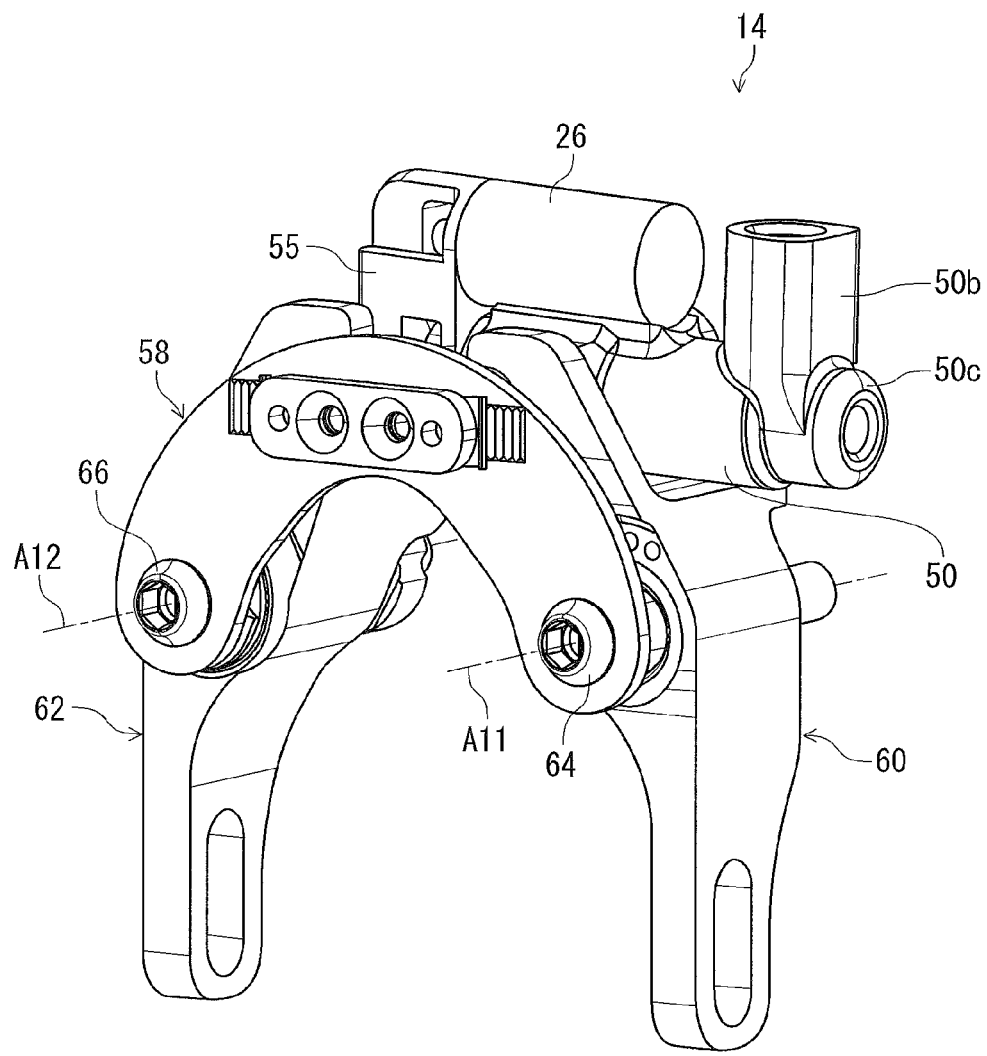
FIG. 4 is a perspective view of the braking device of the bicycle braking system illustrated in FIG. 1.

As seen in FIG. 4, the braking device 14 further includes a base frame 58, a first arm 60, a second arm 62, a first pivot shaft 64, and a second pivot shaft 66. The base frame 58 is configured to be mounted to the bicycle frame (not shown). The first arm 60 is pivotably attached to the base frame 58 by the first pivot shaft 64. The second arm 62 is pivotably attached to the base frame 58 by the second pivot shaft 66. The first arm 60 is pivotable relative to the base frame 58 about a first pivot axis A11. The second arm 62 is pivotable relative to the base frame 58 about a second pivot axis A12 substantially parallel to the first pivot axis A11.

Figure 5:
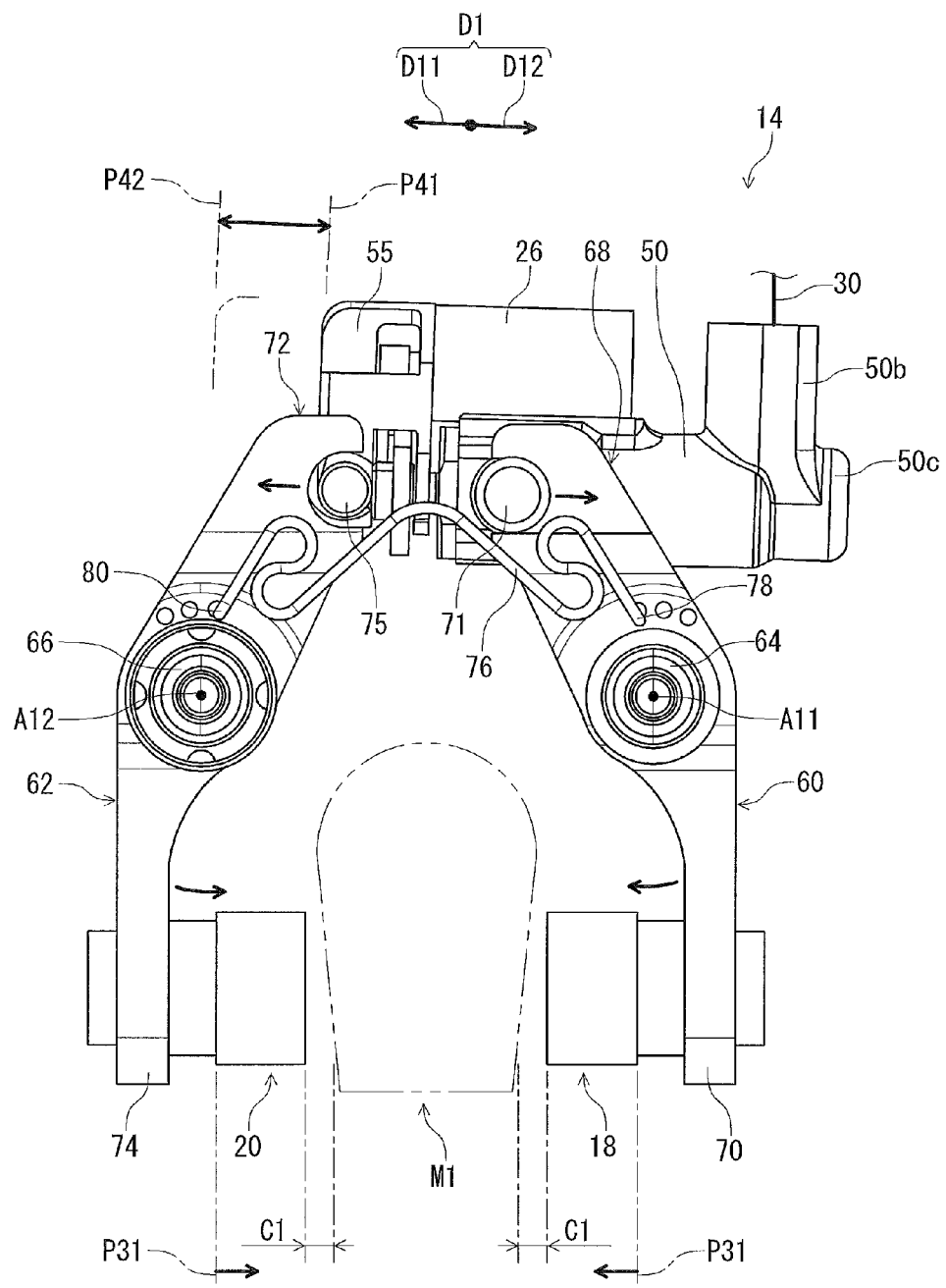
FIG. 5 is a side elevational view of the braking device of the bicycle braking system illustrated in FIG. 1.
Figure 6:
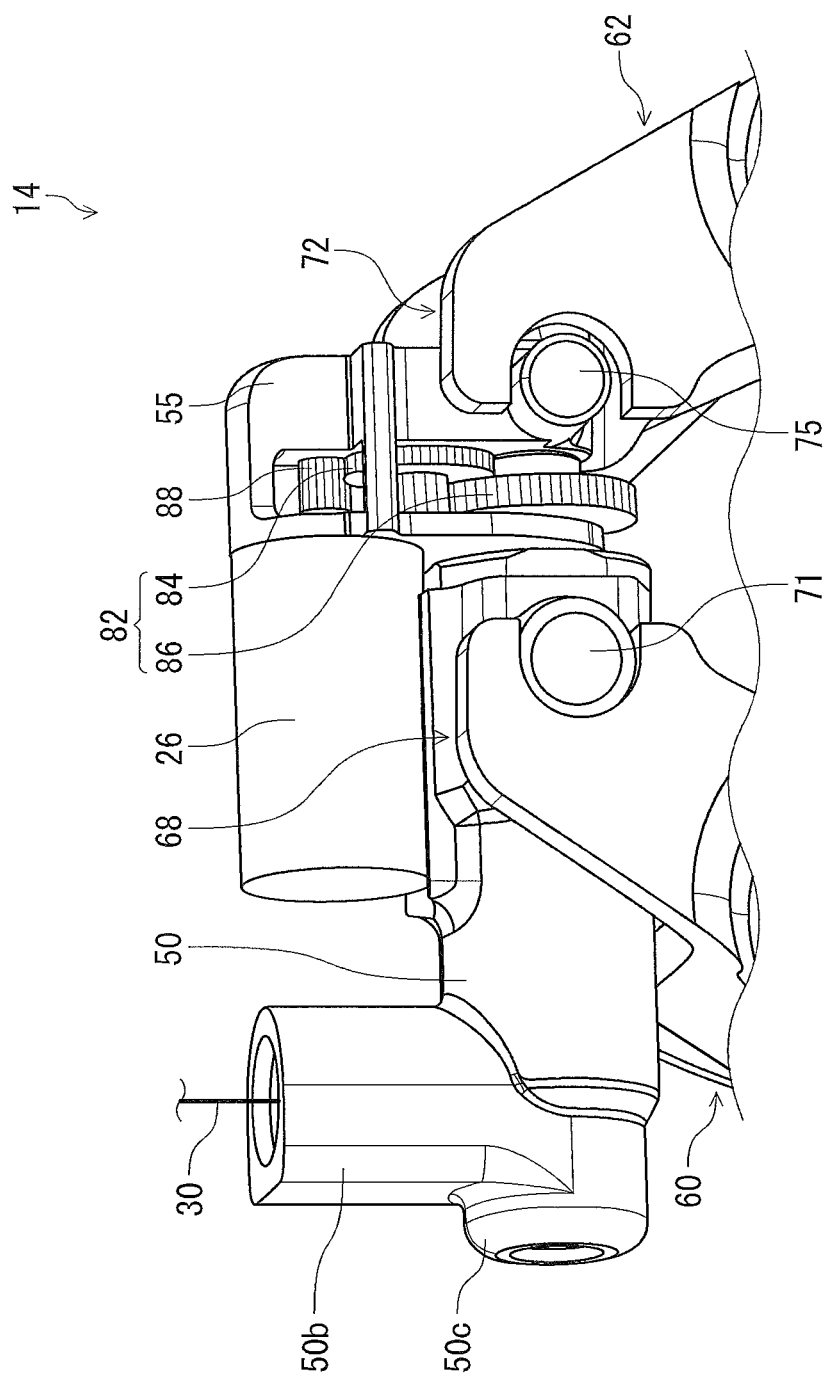
FIG. 6 is a partial perspective view of the braking device of the bicycle braking system illustrated in FIG. 1.

As seen in FIG. 5, the first arm 60 include a first coupling end 68 and a first attachment end 70 opposite to the first coupling end 68 relative to the first pivot axis A11. In the illustrated embodiment, the slave cylinder 50 is pivotally coupled to the first coupling end 68 to transmit the operating force to the first arm 60. The first friction member 18 is attached to the first attachment end 70. As seen in FIGS. 5 and 6, the slave cylinder 50 includes first coupling portions 71 configured to engage with the first coupling end 68 of the first arm 60.

As seen in FIG. 5, the second arm 62 include a second coupling end 72 and a second attachment end 74 opposite to the second coupling end 72 relative to the second pivot axis A12. The transmitting member 55 is pivotally coupled to the second coupling end 72 of the second arm 62 to transmit the operating force to the second arm 62. The second friction member 20 is attached to the second attachment end 74. As seen in FIGS. 5 and 6, the transmitting member 55 includes second coupling portions 75 configured to engage with the second coupling end 72 of the second arm 62.

As seen in FIG. 5, the braking device 14 further includes an arm biasing member 76 configured to bias the first arm 60 and the second arm 62 so that the first friction member 18 and the second friction member 20 are positioned at the rest positions P31. The arm biasing member 76 includes a first end portion 78 and a second end portion 80. The first end portion 78 is configured to engage with the first arm 60. The second end portion 80 is configured to engage with the second arm 62. The arm biasing member 76 is configured to bias the first arm 60 and the second arm 62 so that the first coupling end 68 and the second coupling end 72 approach each other.

The rest positions P31 of the first friction member 18 and the second friction member 20 are defined by a relative position between the slave cylinder 50 and the transmitting member 55 in the axial direction D1 in a rest state of the braking device 14. When the transmitting member 55 moves away from the slave cylinder 50 in the first axial direction D11, the first friction member 18 and the second friction member 20 approach each other. This reduces the clearances C1 between the movable member M1 and each of the first friction member 18 and the second friction member 20.

As seen in FIG. 3, the transmitting member 55 is attached to the actuator 26 and is movable together with the actuator 26 relative to the slave cylinder 50. The transmitting member 55 includes a through hole 55a. The slave piston 52 is inserted in the through hole 55a of the transmitting member 55.

While the actuator 26 is provided on the braking device 14 in the illustrated embodiment, the actuator 26 can be provided on the operating device 12 if needed and/or desired. In such an embodiment, the actuator 26 is configured to change a relative position between the operating member 16 and the master piston 38 so that the braking device 14 is actuated to move the at least one friction member 18 and/or 20 via the hydraulic fluid. In this case, for example, the reservoir tank 44 is omitted from the operating device 12 to certainly transmit the motion of the actuator 26 to the braking device 14 via the hydraulic fluid.

As seen in FIG. 3, the adjusting device 24 includes an adjusting transmission 82 configured to move the transmitting member 55 with respect to the slave piston 52 in response to actuation of the actuator 26. The adjusting transmission 82 includes a first gear 84 and a second gear 86. The first gear 84 is configured to mesh with an output gear 88 of the actuator 26. The second gear 86 is configured to mesh with the first gear 84. The first gear 84 and the second gear 86 are rotatably attached to the transmitting member 55.

The second gear 86 is attached to the slave piston 52. More specifically, the second gear 86 includes a thread hole 86a. The slave piston 52 includes a thread part 52a configured to engage with the thread hole 86a. The actuator 26 rotates the second gear 86 relative to the slave piston 52 to move the transmitting member 55 with respect to the slave piston 52 in the axial direction D1. Namely, the actuator 26 rotates the second gear 86 relative to the slave piston 52 and the transmitting member 55 to change the clearances C1 in a rest state where the first friction member 18 and the second friction member 20 are disposed at the rest positions P31.

Figure 7:
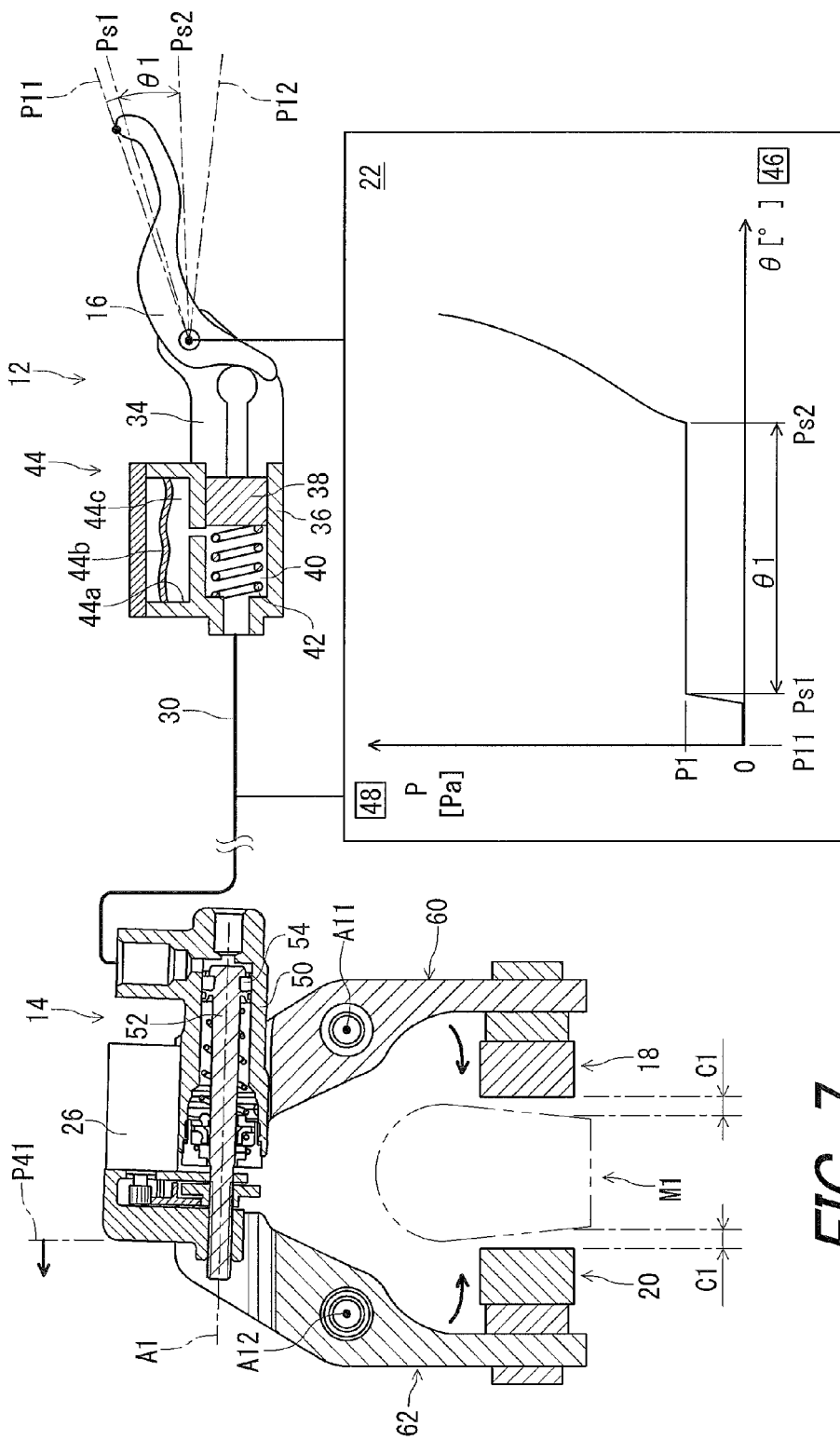
FIG. 7 is a schematic diagram of the bicycle braking system with a graph indicating first information and second information.

As seen in FIG. 7, the hydraulic pressure P of the master chamber 40 changes in response to the operation angle θ of the operating member 16. The hydraulic pressure P sensed by the second sensor 48 is substantially zero while the operating member 16 is pivoted from the rest position P11 to an angular position Ps1 because of the flexible diaphragm 44b of the reservoir tank 44 (FIG. 2). However, the hydraulic pressure P sensed by the second sensor 48 increases up to a first hydraulic pressure P1 after the interior volume of the fluid chamber 44c reaches a maximum volume.

The first hydraulic pressure P1 substantially depends on a biasing force of the return biasing member 57 (FIG. 2). The hydraulic pressure is transmitted from the master chamber 40 to the slave chamber 54 of the braking device 14 via a hydraulic fluid in the hydraulic hose 30. The hydraulic pressure transmitted to the slave chamber 54 moves the slave piston 52 and the transmitting member 55 relative to the slave cylinder 50 against the biasing force of the return biasing member 57 in the first axial direction D11.

The relative movement between the transmitting member 55 and the slave cylinder 50 pivots the first arm 60 and the second arm 62 about the first pivot axis A11 and the second pivot axis A12. The hydraulic pressure of the master chamber 40 is kept around the first hydraulic pressure P1 until the first friction member 18 and the second friction member 20 come into contact with the movable member M1. The first friction member 18 and the second friction member 20 come into contact with the movable member M1 when the operating member 16 reaches an angular position Ps2. Thus, the hydraulic pressure P1 is kept between the angular positions Ps1 and Ps2 of the operating member 16. An operation angle θ1 defined between the angular positions Ps1 and Ps2 depends on the clearances C1.

As seen in FIG. 7, when the operating member 16 is further pivoted from the angular position Ps2, the first friction member 18 and the second friction member 20 are pressed against the movable member M1 by the hydraulic pressure from the operating device 12. At this time, the hydraulic pressure P further increases from the first hydraulic pressure P1 in response to elastic deformation of each of the first friction member 18 and the second friction member 20, causing the braking force to be applied from the first friction member 18 and the second friction member 20 to the movable member M1.

Figure 8:
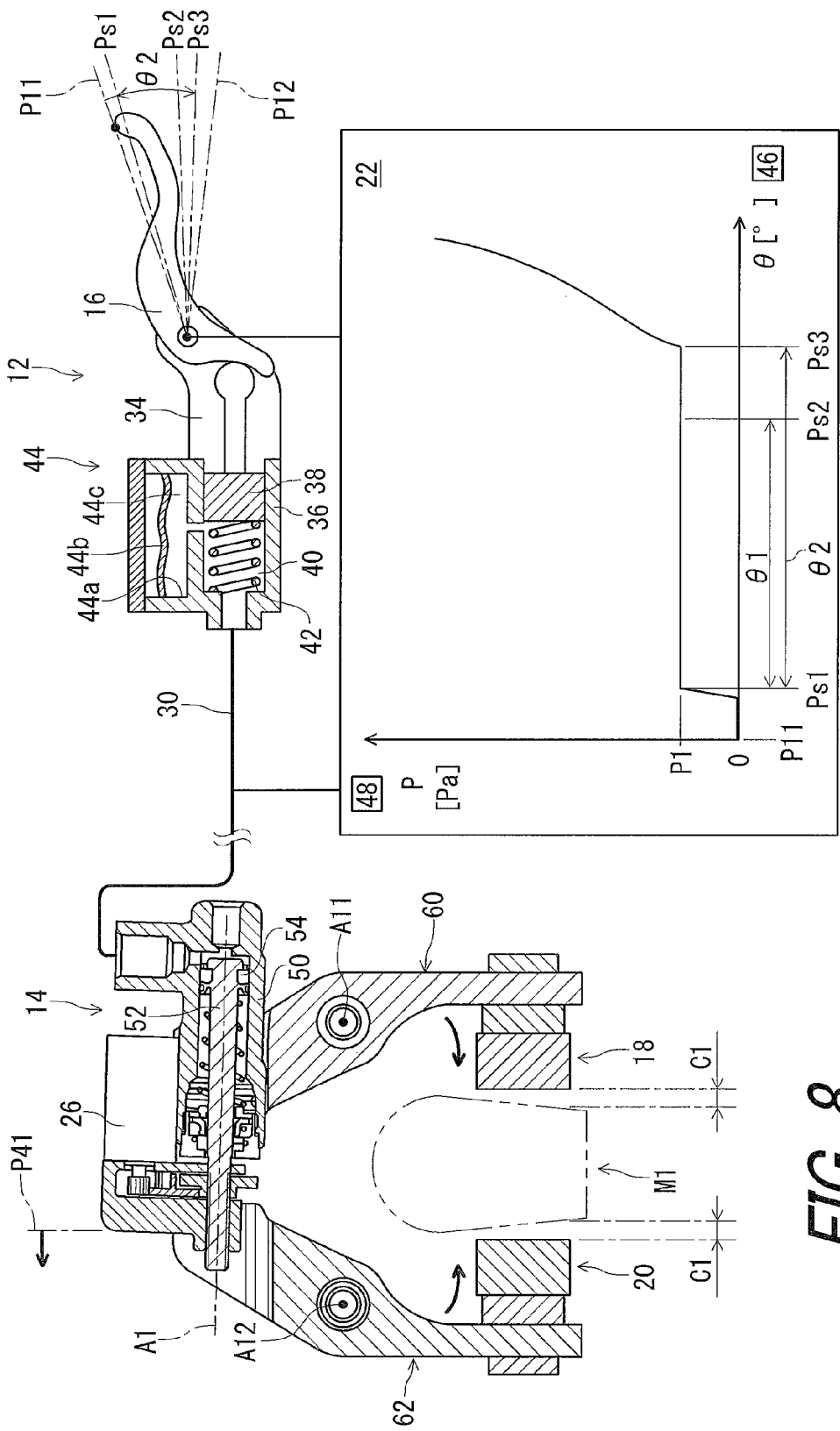
FIG. 8 is a schematic diagram of the bicycle braking system with a graph indicating first information and second information.

As seen in FIG. 8, each of the clearances C1 increases in accordance with an amount of wear of each of the first friction member 18 and the second friction member 20. An increase in each of the clearances C1 makes the operation angle θ1 of the operating member 16 larger. More specifically, in a case where the clearances C1 increase, the first friction member 18 and the second friction member 20 come into contact with the movable member M1 when the operating member 16 reaches an angular position Ps3 beyond the angular position Ps2. Thus, the hydraulic pressure P1 is kept between the angular positions Ps1 and Ps3 of the operating member 16. An operation angle θ2 defined between the angular positions Ps1 and Ps3 is larger than the operation angle θ1 defined between the angular positions Ps1 and Ps2. This reduces the response of the bicycle braking system 10.

To keep the quick response in the bicycle braking system 10, the adjustment controller 28 (FIG. 1) is configured to obtain a comparing value relating to the clearance C1 between the at least one friction member 18 and/or 20 and the movable member M1 based on the first information and the second information. In more detail, the adjustment controller 28 is configured such that the CPU 28a (FIG. 1) calculates the comparing value based on the first information and the second information and the CPU 28a stores the comparing value in the RAM 28c (FIG. 1). In the illustrated embodiment, possible examples of the comparing value include a size of a clearance and a value indicative of the size of the clearance. For example, the comparing value can include the operation angle of the operating member 16 corresponding to the clearance C1. The adjustment controller 28 serves as a clearance-value obtaining part configured to obtain the comparing value relating to the clearance C1 between the at least one friction member 18 and/or 20 and the movable member M1 based on the first information and the second information.

The adjustment controller 28 is configured to obtain, as the comparing value, the operation angle of the operating member 16 corresponding to the clearances C1 based on the angular position of the operating member 16 and the hydraulic pressure of the master chamber 40.

Figure 9:
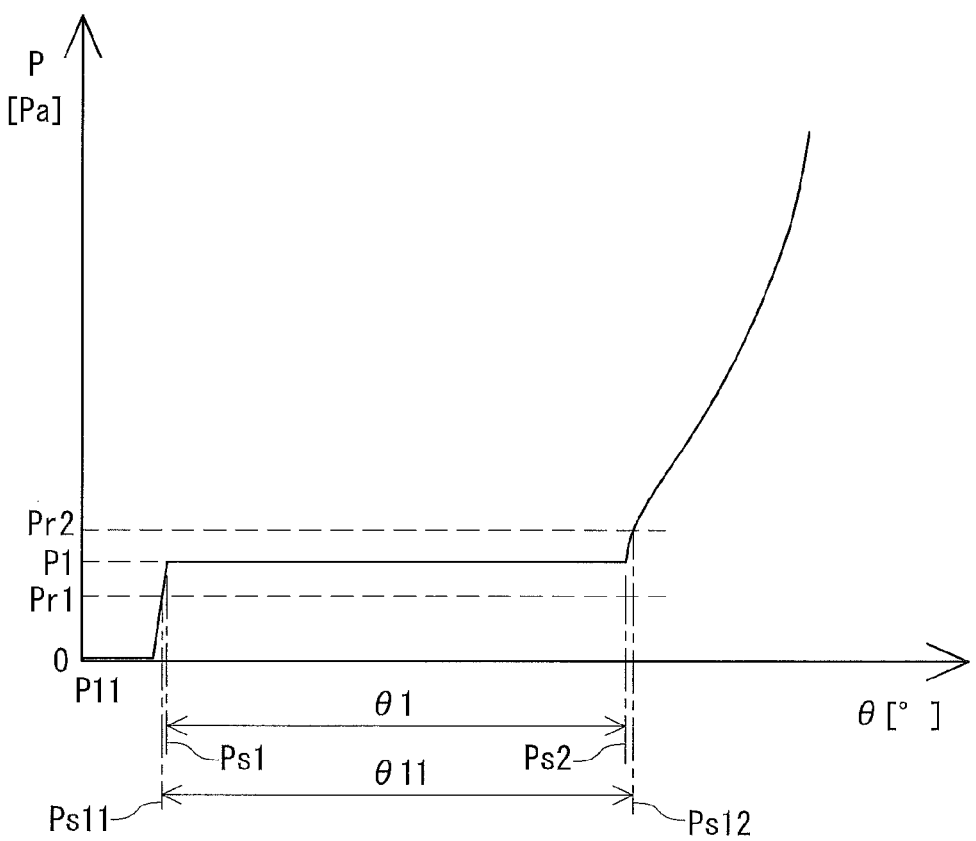
FIG. 9 is a graph indicating first information and second information for explaining a method of obtaining a comparing value.

As seen in FIG. 9, the adjustment controller 28 is configured to compare the hydraulic pressure P sensed by the second sensor 48 with a first reference pressure Pr1. The first reference pressure Pr1 is stored in the ROM 28b (FIG. 1). The adjustment controller 28 is configured to obtain, as a first angular position, an angular position Ps11 sensed by the first sensor 46 when the hydraulic pressure P sensed by the second sensor 48 is higher than the first reference pressure Pr1. The first angular position Ps11 is stored in the RAM 28c.

The adjustment controller 28 is configured to compare the hydraulic pressure P sensed by the second sensor 48 with a second reference pressure Pr2 higher than the first reference pressure Pr1. The second reference pressure Pr2 is stored in the ROM 28b. The adjustment controller 28 is configured to obtain, as a second angular position, an angular position Ps12 sensed by the first sensor 46 when the hydraulic pressure P sensed by the second sensor 48 is higher than the second reference pressure Pr2. The adjustment controller 28 is configured to store the second angular position Ps12 obtained by the adjustment controller 28.

The adjustment controller 28 is configured to calculate an operation angle between the first angular position Ps11 and the second angular position Ps12. More specifically, the adjustment controller 28 is configured to subtract the first angular position Ps11 from the second angular position Ps12 to calculate an operation angle θ11. The operation angle θ11 is stored in the RAM 28c as the comparing value.

As seen in FIG. 9, the first angular position Ps11 is smaller than but substantially equal to the angular position Ps1. The second angular position Ps12 is larger than but substantially equal to the angular position Ps2. The operation angle θ11 is substantially equal to the operation angle θ1. Namely, it can be said that the operation angle θ11 substantially corresponds to the clearance C1.

As seen in FIG. 1, the adjustment controller 28 is configured to compare the comparing value with a reference value in an adjusting mode. In the adjusting mode, the adjustment controller 28 is configured to adjust the clearance C1 between the at least one friction member 18 and/or 20 and the movable member M1 based on the first information and the second information. In the illustrated embodiment, the adjustment controller 28 is configured to compare the operation angle θ11 with a reference operation angle θr1. The reference operation angle θr1 is stored in the RAM 28c as the reference value. The adjustment controller 28 serves as a clearance-value comparator configured to compare the comparing value with the reference value.

The adjustment controller 28 is configured to control the actuator 26 to move the at least one friction member 18 and/or 20 based on a comparison between the comparing value and the reference value. The adjustment controller 28 serves as an actuator driver configured to control the actuator 26 to move the at least one friction member 18 and/or 20 based on a comparison between the comparing value and the reference value.

The comparing value (the operation angle θ11) obtained by the adjustment controller 28 can slightly vary even if the amount of wear of each of the first friction member 18 and the second friction member 20 does not change. Accordingly, in the illustrated embodiment, an average of comparing values (the operation angles) obtained by the adjustment controller 28 is used as the comparing value (as the operation angle) in the adjusting mode.

More specifically, the adjustment controller 28 is configured to store first to N1-th latest comparing values. N1 is an integer equal to or larger than 2. In the illustrated embodiment, for example, the adjustment controller 28 is configured to store first to tenth latest operation angles $\theta c1$ to $\theta c10$ as the first to N1-th latest comparing values. The first latest operation angle $\theta c1$ is the latest data among the first to tenth latest operation angles $\theta c1$ to $\theta c10$. The tenth latest operation angle $\theta c10$ is the oldest data among the first to tenth latest operation angles $\theta c1$ to $\theta c10$. The adjustment controller 28 serves as a latest clearance memory configured to store first to N1-th latest comparing values.

When the adjustment controller 28 obtains a new comparing value (a new operation angle), the first to N1-th latest comparing values are updated. More specifically, the new comparing value (the new operation angle) is stored in the RAM 28c as the first latest comparing value (as the first latest operation angle $\theta c1$). The previous first to ninth latest comparing values (the previous first to ninth latest operation angles $\theta c1$ to $\theta c9$) are stored in the RAM 28c as the second to tenth latest comparing values (as the second to tenth latest operation angles $\theta c2$ to $\theta c10$), respectively. The previous tenth latest comparing value (the previous tenth latest operation angle $\theta c10$) is deleted from the RAM 28c.

As seen in FIG. 1, the adjustment controller 28 is configured to calculate, as the comparing value, an average value of the first to N1-th latest comparing values. In the illustrated embodiment, the adjustment controller 28 is configured to calculate, as an average operation angle $\theta av1$, the average value of the first to tenth latest operation angles $\theta c1$ to $\theta c10$. The adjustment controller 28 is configured to store the average operation angle $\theta av1$. The adjustment controller 28 is configured to compare the average operation angle $\theta av1$ with the reference operation angle $\theta r1$. The adjustment controller 28 is configured to control the actuator 26 to move the at least one friction member 18 and/or 20 based on a comparison between the average operation angle $\theta av1$ and the reference operation angle $\theta r1$.

The total number of the first to tenth latest comparing values (the first to tenth latest operation angles $\theta c1$ to $\theta c10$) stored in the adjustment controller 28 is not limited to ten. The adjustment controller 28 can store at least first and second latest comparing value (first and second latest operation angles $\theta c1$ and $\theta c2$) among comparing values (operation angles) obtained by the adjustment controller 28.

Furthermore, the adjustment controller 28 can store only the first latest comparing value (the first latest operation angle $\theta c1$) obtained by the adjustment controller 28 if needed and/or desired. In such an embodiment, the adjustment controller 28 does not need to calculate the average value of the first to N1-th latest comparing values, and the first latest operation angle $\theta c1$ is used as the comparing value instead of the average value of the first to N1-th latest comparing values for adjusting the clearance C1.

As seen in FIG. 1, the adjustment controller 28 is configured to control the actuator 26 to adjust the clearance C1 between the at least one friction member 18 and/or 20 and the movable member M1 in a case where the comparing value is larger than the reference value by a reference differential value or more. In the illustrated embodiment, the adjustment controller 28 is configured to control the actuator 26 to adjust the clearance C1 in a case where the average operation angle $\theta av1$ is larger than the reference operation angle $\theta r1$ by the reference differential value Dr1 or more. For example, the reference differential value Dr1 is stored in the ROM 28b.

The bicycle braking system 10 has a setting mode in addition to the adjusting mode. The adjustment controller 28 is configured to allow a user to select one of the adjusting mode and the setting mode via a mode selector (not shown). The adjustment controller 28 is configured to determine a mode of the bicycle braking system 10 based on mode information inputted via the mode selector by a user.

As seen in FIG. 1, the adjustment controller 28 is configured to obtain the reference value based on the first information and the second information in the setting mode. In the illustrated embodiment, the adjustment controller 28 is configured to obtain the reference operation angle $\theta r1$ based on the operation angle of the operating member 16 and the hydraulic pressure of the master chamber 40 in the setting mode. The adjustment controller 28 serves as a reference obtaining part configured to obtain the reference value based on the first information and the second information in the setting mode.

The adjustment controller 28 is configured to store first to N2-th latest comparing values in the setting mode. N2 is an integer equal to or larger than 2. In the illustrated embodiment, the adjustment controller 28 is configured to store first to fifth latest operation angles $\theta s1$ to $\theta s5$ in the RAM 28c in the setting mode. In the RAM 28c, the first to N2-th latest comparing values are stored in a storage area different from a storage area for the first to N1-th latest comparing values. The adjustment controller 28 serves as a reference clearance memory configured to store first to N2-th latest comparing values in the setting mode.

As seen in FIG. 1, the adjustment controller 28 is configured to calculate, as the reference value, an average value of the first to N2-th latest comparing values in the setting mode. In the illustrated embodiment, the adjustment controller 28 is configured to calculate, as the reference operation angle $\theta r1$, an average value of the first to fifth latest operation angles $\theta s1$ to $\theta s5$ stored in the RAM 28c. However, the adjustment controller 28 can be configured to store, in the setting mode, one comparing value as the reference value without calculating the average value of the first to N2-th latest comparing values.

After the first friction member 18 and the second friction member 20 are replaced to new friction members or after the clearance C1 between the movable member M1 and each of the first friction member 18 and the second friction member 20 is readjusted, the reference value (the reference operation angle $\theta r1$) is set by the adjustment controller 28 based on the operation angle of the operating member 16 and the hydraulic pressure of the master chamber 40 in the setting mode. This allows the adjustment controller 28 to reset the reference value (the reference operation angle $\theta r1$) in accordance with the new friction members and/or the readjusted size of the clearance C1.

The method of adjusting the clearance C1 between the movable member M1 and each of the first friction member 18 and the second friction member 20 will be described in detail referring to FIGS. 10 to 12.

Figure 10:
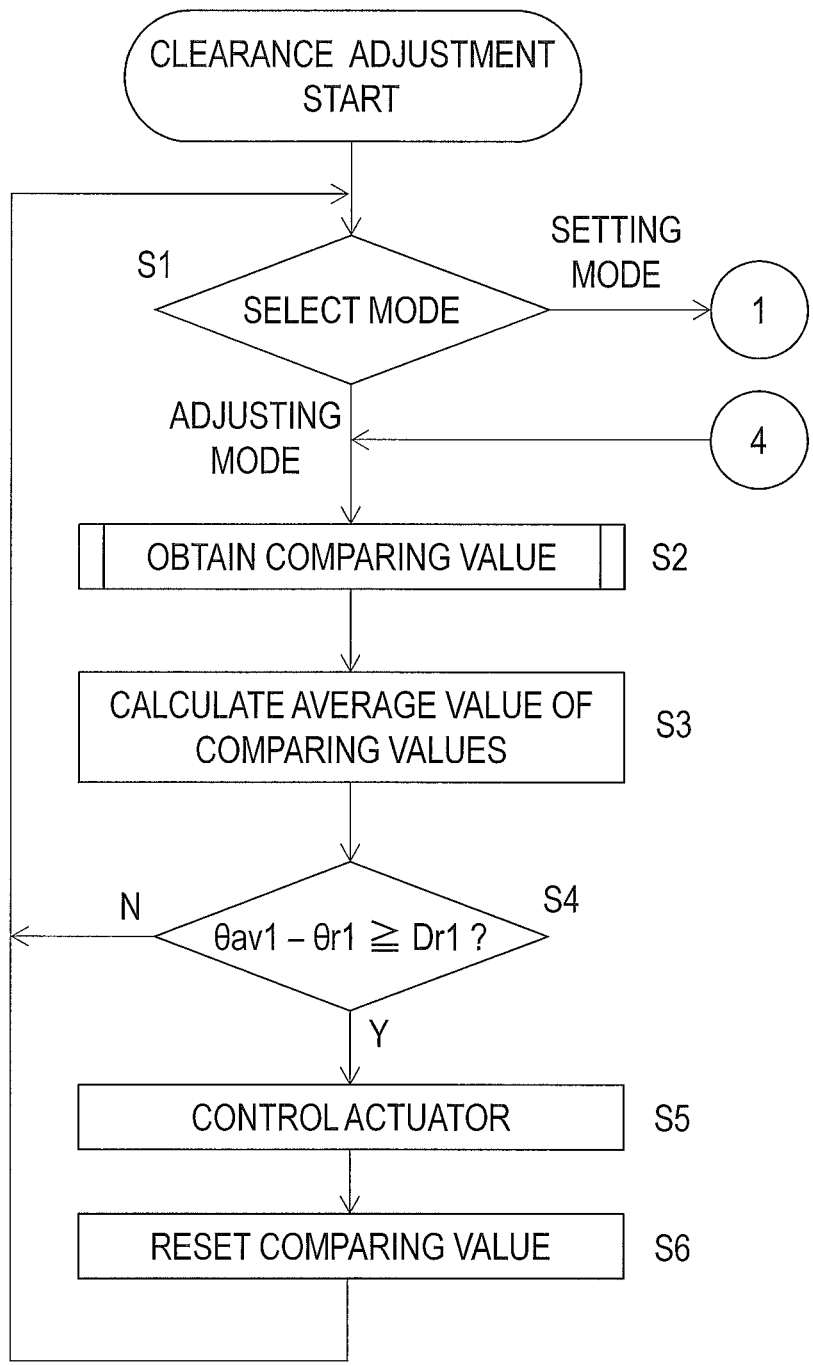
FIG. 10 is a flow chart of an operation of the bicycle braking system illustrated in FIG. 1.

As seen in FIG. 10, in steps 1 and S2, in a case where the adjusting mode is selected, the comparing value calculation starts. More specifically, the comparing value relating to the clearance C1 between the at least one friction member 18 and/or 20 and the movable member M1 is obtained by the adjustment controller 28 based on the first information and the second information (FIG. 1). In the illustrated embodiment, the latest comparing value (the latest operation angle $\theta c1$) is obtained by the adjustment controller 28 based on the operation angle and the hydraulic pressure.

In step S3, the average value of the comparing values is calculated by the adjustment controller 28. In the illustrated embodiment, the average operation angle $\theta av1$ is calculated by the adjustment controller 28 based on the first to tenth latest operation angles $\theta c1$ to $\theta c10$.

In step S4, the comparing value is compared with the reference value by the adjustment controller 28. More specifically, it is determined by the adjustment controller 28 whether the average operation angle $\theta av1$ is larger than the reference operation angle $\theta r1$ by the reference differential value Dr1 or more. In a case where it is determined that the average operation angle $\theta av1$ is not larger than the reference operation angle $\theta r1$ by the reference differential value Dr1 or more, the steps S1 to S4 are repeated in each braking operation of the braking device 14.

In step S5, in a case where it is determined that the average operation angle $\theta av1$ is larger than the reference operation angle $\theta r1$ by the reference differential value Dr1 or more, the actuator 26 is controlled by the adjustment controller 28 to adjust the clearance C1 between the movable member M1 and each of the first friction member 18 and the second friction member 20. More specifically, as seen in FIG. 3, a driving signal is sent from the adjustment controller 28 (FIG. 1) to the actuator 26 so that the actuator 26 moves the transmitting member 55 relative to the slave piston 52 by a predetermined amount of axial movement. This moves the first friction member 18 and the second friction member 20 toward the movable member M1 by a predetermined distance corresponding to the predetermined amount of axial movement. Accordingly, it is possible to adjust the size of the clearance C1 to be closer to or equal to a size of a clearance corresponding to the reference value.

While the axial movement of the transmitting member 55 is constant in one adjusting operation in the illustrated embodiment, the axial movement of the transmitting member 55 can be changed in accordance with the difference between the average operation angle $\theta av1$ and the reference operation angle $\theta r1$.

As seen in FIG. 10, in step S6, the latest comparing values are deleted from the adjustment controller 28. The above steps S2 to S6 are repeated in the adjusting mode so that the clearance C1 is substantially adjusted to a clearance corresponding to the reference value.

Figure 11:
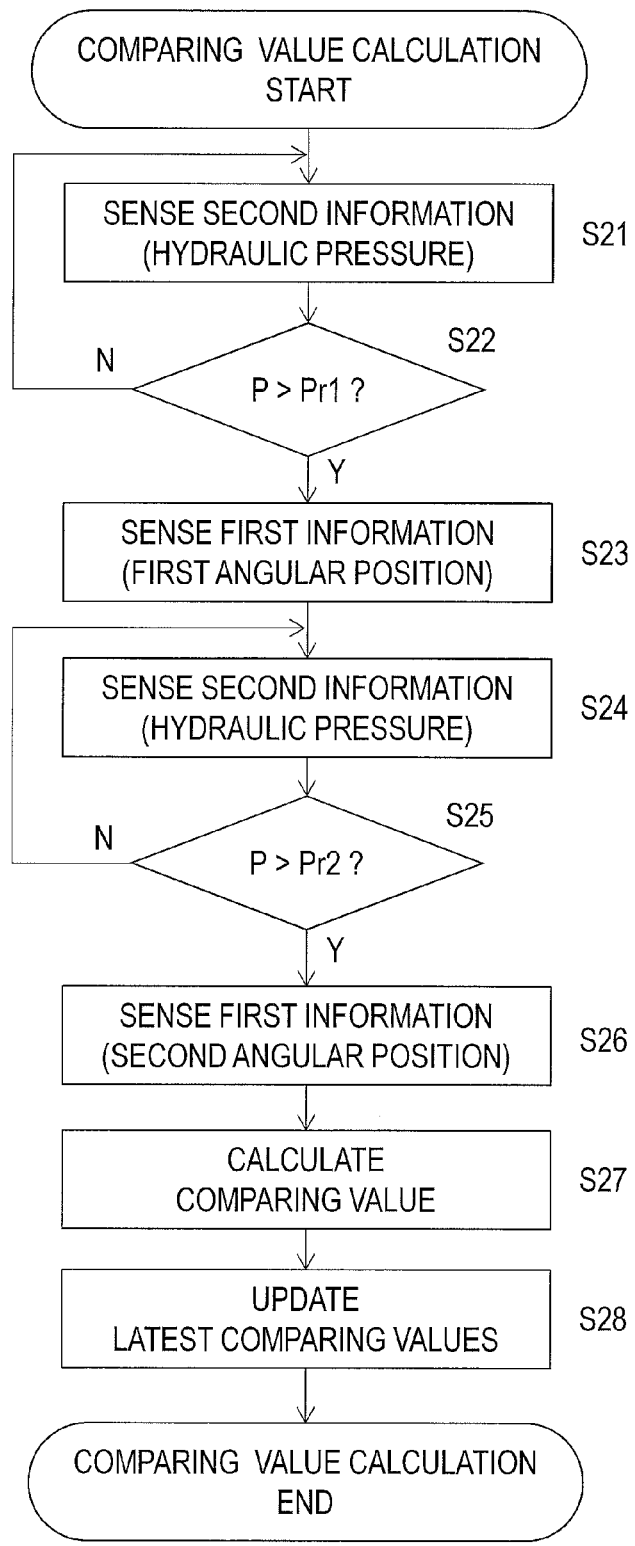
FIG. 11 is a flow chart of an operation of the bicycle braking system illustrated in FIG. 1.

FIG. 11 illustrates the process of step S2 (FIG. 10) for obtaining the comparing value. More specifically, in step S21, the second information (the hydraulic pressure of the master chamber 40) is sensed by the second sensor 48. When the operating member 16 is operated by the user, the hydraulic pressure of the master chamber 40 varies as illustrated in FIG. 9.

As seen in FIG. 11, in step S22, the hydraulic pressure P sensed by the second sensor 48 is compared with the first reference pressure Pr1 by the adjustment controller 28. In a case where the hydraulic pressure P sensed by the second sensor 48 is equal to or lower than the first reference pressure Pr1, the steps S21 and S22 are repeated. In step S23, the angular position sensed by the first sensor 46 is obtained as the first angular position Ps11 by the adjustment controller 28 when the hydraulic pressure P sensed by the second sensor 48 is higher than the first reference pressure Pr1 (FIG. 9). The first angular position Ps11 is stored in the RAM 28c of the adjustment controller 28 (FIG. 1).

In step S24, the second information (the hydraulic pressure of the master chamber 40) is sensed by the second sensor 48. In a case where the hydraulic pressure P sensed by the second sensor 48 is equal to or lower than the second reference pressure Pr2, the steps S24 and S25 are repeated.

In step S25, the hydraulic pressure P sensed by the second sensor 48 is compared with the second reference pressure Pr2 by the adjustment controller 28. In step S26, the angular position sensed by the first sensor 46 is obtained as the second angular position Ps12 by the adjustment controller 28 when the hydraulic pressure P sensed by the second sensor 48 is higher than the second reference pressure Pr2 (FIG. 9). The second angular position Ps12 is stored in the RAM 28c of the adjustment controller 28 (FIG. 1).

In step S27, the comparing value is calculated by the adjustment controller 28 based on the first angular position Ps11 and the second angular position Ps12. More specifically, the operation angle $\theta 11$ (FIG. 9) is calculated by the CPU 28a based on the first angular position Ps11 and the second angular position Ps12 stored in the RAM 28c (FIG. 1).

In step S28, the latest comparing values are updated in the adjustment controller 28. More specifically, the operation angle $\theta 11$ calculated by the CPU 28a in step S27 is stored as the first latest operation angle $\theta c1$ in the RAM 28c. The previous first to ninth latest operation angle $\theta c1$ to $\theta c9$ are respectively stored as the second to tenth latest operation angles $\theta c2$ to $\theta c10$. The previous tenth latest operation angle 74 c10 is deleted from the RAM 28c. In step S3 of FIG. 10, the average value of the updated first to tenth latest operation angles $\theta c1$ to $\theta c10$ is calculated by the adjustment controller 28.

Figure 12:
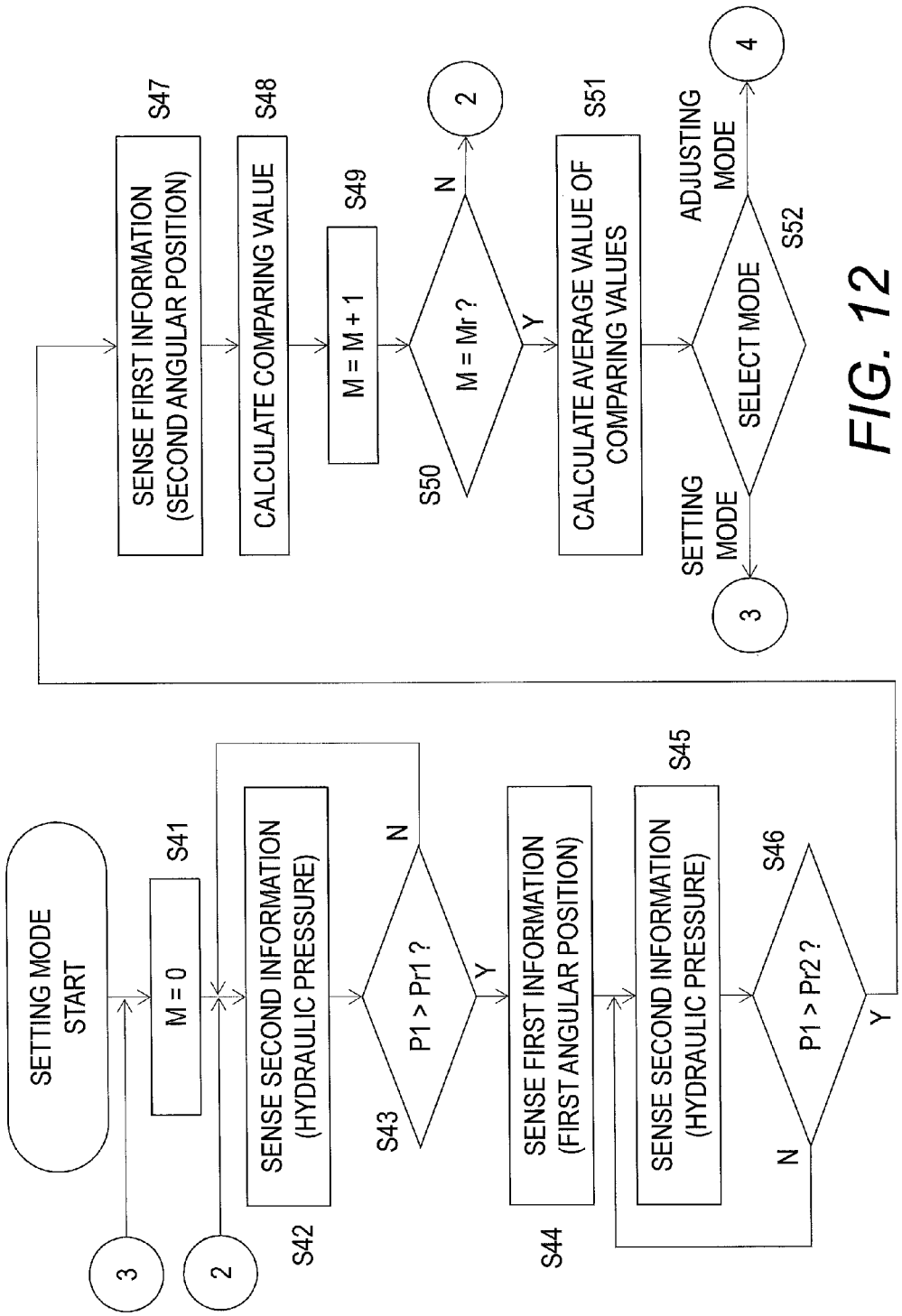
FIG. 12 is a flow chart of an operation of the bicycle braking system illustrated in FIG. 1.

As seen in FIG. 12, in the setting mode, the average value of first to N2-th latest comparing values is calculated as the reference value by the adjustment controller 28. More specifically, in step S41, a repeat count M of obtaining a comparing value in the setting mode is reset to zero. In steps S42 to S48, an operation angle is obtained by the adjustment controller 28 as well as the steps S21 to S27 of FIG. 11. Since steps S42 to S48 are substantially the same as the steps S21 to S27 as shown in FIG. 11, they will not be described in detail here for the sake of brevity.

In step S49, the repeat count M is incremented by one. In step S50, the repeat count M is compared with a reference repeat count Mr. In a case where the repeat count M is not equal to the reference repeat count Mr, the steps S42 to S50 are repeated. In the illustrated embodiment, the reference repeat count Mr is set to five, corresponding to the first to fifth latest operation angles $\theta s1$ to $\theta s5$.

In a case where the repeat count M is equal to the reference repeat count Mr, the average value of the first to N2-th latest comparing values stored in the RAM 28c is calculated as the reference value by the adjustment controller 28. More specifically, an average value of the first to fifth latest operation angles $\theta s1$ to $\theta s5$ stored in the RAM 28c is calculated as the reference operation angle $\theta r1$ by the CPU 28a. The average value of the first to fifth latest operation angles $\theta s1$ to $\theta s5$ is stored in the RAM 28c as the reference operation angle $\theta r1$.

In step S52, the steps S41 to S51 are repeated in a case where the setting mode is selected in the mode selector (not shown). The process is returned to step S2 of FIG. 10 in a case where the adjusting mode is selected in the mode selector (not shown). In the adjusting mode, the average value of the first to fifth latest operation angles $\theta s1$ to $\theta s5$ obtained in the setting mode is used as the reference value (the reference operation angle $\theta r1$).

With the bicycle braking system 10, the sensing device 22 is configured to sense the first information relating to the operation amount of the operating member 16 and the second information relating to the operating force of the operating member 16. Accordingly, it is possible to obtain the clearance C1 between the at least one friction member 18 and/or 20 and the movable member M1 based on the first information and the second information. Furthermore, the adjusting device 24 is configured to adjust the position of the at least one friction member 18 and/or 20 based on the first information and the second information. Accordingly, it is possible to adjust the clearance C1 between the at least one friction member 18 and/or 20 and the movable member M1 in accordance with the first information and the second information, which allows the bicycle braking system 10 to keep the quick response regardless of wear of the at least one friction member 18 an/or 20.

Second Embodiment

A bicycle braking system 210 in accordance with a second embodiment will be described below referring to FIGS. 13 and 14. Elements having substantially the same function as those in the first embodiment will be numbered the same here, and will not be described and/or illustrated again in detail here for the sake of brevity.

Unlike the bicycle braking system 10, a mechanical operating system is applied to the bicycle braking system 210 instead of the hydraulic operating system. More specifically, as seen in FIG. 13, the bicycle braking system 210 comprises a control cable 231 instead of the hydraulic hose 30. The control cable 231 is operatively coupled to the operating member 16 and the braking device 14 to transmit the motion of the operating member 16 to the braking device 14. Possible examples of the control cable 231 include a Bowden cable.

Figure 14:
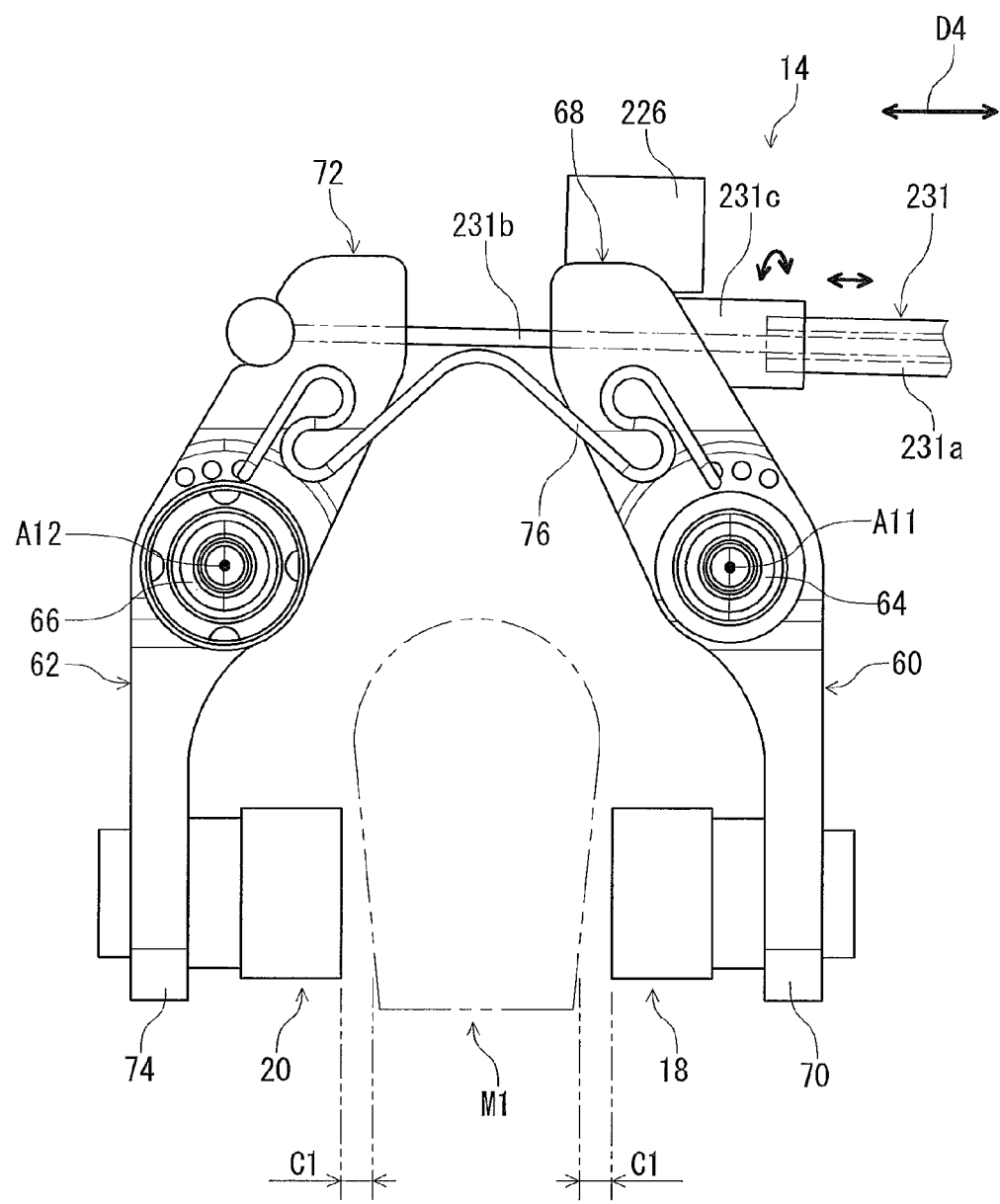
FIG. 14 is a side elevational view of the bicycle braking system illustrated in FIG. 13.

As seen in FIG. 14, the control cable 231 includes an outer casing 231a and an inner wire 231b. The outer casing 231a movably supports the inner wire 231b. The inner wire 231b extends through an inside of the outer casing 231a. An end of the inner wire 231b is configured to operatively couple the operating member 16 to the second coupling end 72 of the second arm 62.

As seen in FIG. 14, an end of the outer casing 231a is connected to the first coupling end 68 of the first arm 60. The control cable 231 includes an adjusting member 231c such as an adjusting nut. The adjusting member 231c is configured to couple the end of the outer casing 231a to the first coupling end 68 of the first arm 60. The adjusting member 231c is configured to adjust a relative position between the outer casing 231a and the first coupling end 68 of the first arm 60 in a direction D4 defined along the inner wire 231b. Rotation of the adjusting member 231c relative to the first arm 60 changes the relative position between the outer casing 231a and the first coupling end 68 of the first arm 60, for example. This changes the clearance C1 in a rest state where the operating member 16 is not operated by the user.

Figure 13:
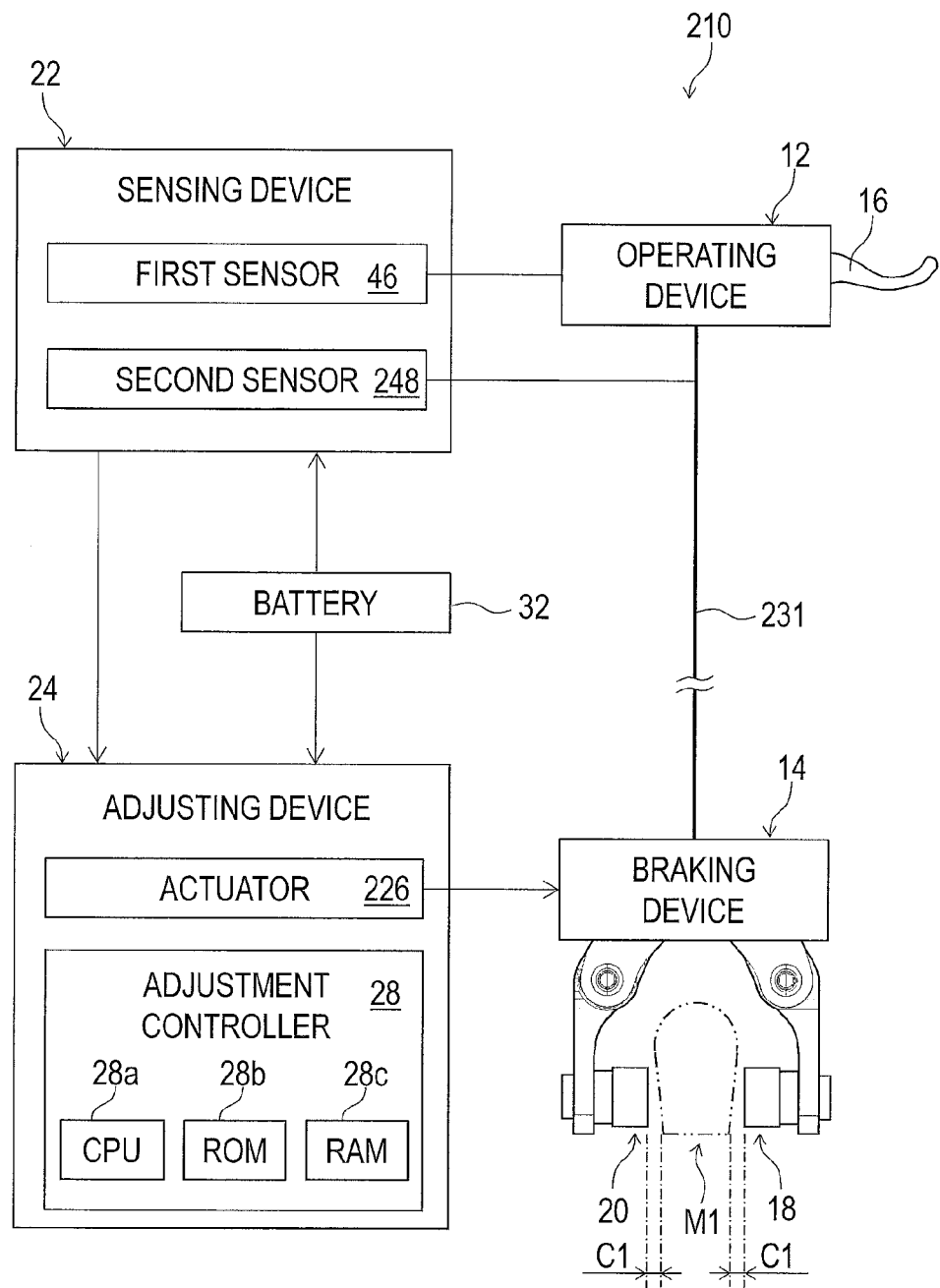
FIG. 13 is a schematic block diagram of a bicycle braking system in accordance with a second embodiment.

In this embodiment, as seen in FIG. 13, the sensing device 22 includes a second sensor 248 configured to sense the second information relating to the operating force of the operating member 16. In the illustrated embodiment, the second sensor 248 is configured to sense the operating force transmitted from the operating member 16 to the second arm 62 via the inner wire 231b (FIG. 14) of the control cable 231. Possible examples of the second sensor 248 include a strain sensor having a strain gauge. The strain gauge (not shown) of the second sensor 248 is attached to the inner wire 231b or a coupling portion between an end of the inner wire 231b and the operating member 16, for example.

As seen in FIGS. 13 and 14, the adjusting device 24 includes an actuator 226 configured to actuate the braking device 14 to move the at least one friction member 18 and/or 20. In the illustrated embodiment, as seen in FIG. 14, the actuator 226 is configured to rotate the adjusting member 231c relative to the first coupling end 68 of the first arm 60. The actuator 226 is mounted on the first coupling end 68 of the first arm 60. The slave cylinder 50, the slave piston 52, and the transmitting member 55 are omitted from the braking device 14.

With the bicycle braking system 210, it is possible to obtain the same advantageous effect as that of the bicycle braking system 10 in accordance with the first embodiment.

To adjust the clearance C1, in the second embodiment, the actuator 226 is configured to adjust the relative position between the outer casing 231a and the first coupling end 68 of the first arm 60 via the adjusting member 231c. However, the actuator 226 can be configured to adjust a relative position between an end of the inner wire 231b and the second coupling end 72 of the second arm 62 if needed and/or desired. Furthermore, the actuator 226 can be mounted to the operation device 12 if needed and/or desired.

The term "configured" as used herein to describe a component, section or part of a device includes hardware and/or software that is constructed and/or programmed to carry out the desired function. The desired function can be carried out by hardware, software, or a combination of hardware and software.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle braking system comprising:
   an operating device including an operating member configured to be operated by a user;
   a braking device configured to apply a braking force to a movable member of a bicycle in response to an operation of the operating member, the braking device including at least one friction member configured to contact the movable member;

a sensing device configured to sense
first information of a movement amount of the operating member, and
second information relating to an operating force of the operating member; and
an adjusting device configured to adjust a position of the at least one friction member based on the first information and the second information,
wherein the adjusting device is configured to adjust a rest position of the at least one friction member, the rest position being a position of the at least one friction member when the operating member is not operated by the user.

2. The bicycle braking system according to claim 1, wherein
the adjusting device includes
an actuator configured to actuate the braking device to move the at least one friction member, and
an adjustment controller configured to control the actuator to move the at least one friction member based on the first information and the second information.

3. The bicycle braking system according to claim 2, wherein
the braking device includes a transmitting member configured to transmit the operating force from the operating member to the at least one friction member,
the at least one friction member is movable from a rest position toward the movable member in response to the operating force transmitted by the transmitting member, and
the actuator is configured to move the transmitting member to change the rest position of the at least one friction member.

4. The bicycle braking system according to claim 3, wherein
the braking device includes
a slave cylinder, and
a slave piston movably provided in the slave cylinder, and
the transmitting member is coupled to the slave piston to move together with the slave piston relative to the slave cylinder.

5. The bicycle braking system according to claim 2, wherein
the adjustment controller is configured to obtain a comparing value relating to a clearance between the at least one friction member and the movable member based on the first information and the second information.

6. The bicycle braking system according to claim 5, wherein
the adjustment controller is configured to compare the comparing value with a reference value, and
the adjustment controller is configured to control the actuator to move the at least one friction member based on a comparison between the comparing value and the reference value.

7. The bicycle braking system according to claim 1, wherein
the operating device includes a main body configured to pivotally support the operating member, and
the sensing device includes a first sensor configured to sense, as the first information, an operation angle of the operating member relative to the main body.

8. The bicycle braking system according to claim 1, wherein
the sensing device includes a second sensor configured to sense, as the second information, an operating force applied from the operating member to the braking device.

9. The bicycle braking system according to claim 8, further comprising
a hydraulic hose configured to hydraulically couple the operating device to the braking device, wherein
the operating device includes
a master cylinder, and
a master piston movably provided in the master cylinder to define a master chamber configured to generate, as the operating force, a hydraulic pressure in response to an operation of the operating member, and
the braking device includes
a slave cylinder, and
a slave piston movably provided in the slave cylinder to define a slave chamber configured to be connected with the master chamber via the hydraulic hose.

10. The bicycle braking system according to claim 9, wherein
the second sensor is configured to sense the hydraulic pressure as the second information.

11. The bicycle braking system according to claim 1, wherein
the braking device includes, as the at least one friction member, a first friction member and a second friction member which are configured to sandwich the movable member between the first friction member and the second friction member to apply the braking force to the movable member.

12. The bicycle braking system according to claim 1, wherein the braking device is configured to directly receive the operating force from the operating device.

13. The bicycle braking system according to claim 1, wherein the braking device is configured to directly receive the operating force from the operating device via a control cable.

14. The bicycle braking system according to claim 1, wherein the braking device is configured to directly receive the operating force from the operating device via hydraulic fluid in a hydraulic hose.

15. The bicycle braking system according to claim 1, wherein the movement amount is an angular position of the operating member.

16. The bicycle braking system according to claim 15, wherein the sensing device includes a rotary encoder to sense the angular position of the operating member.

17. A bicycle braking system comprising:
an operating device including an operating member configured to be operated by a user;
a braking device configured to apply a braking force to a movable member of a bicycle in response to an operation of the operating member, the braking device including at least one friction member configured to contact the movable member;
a sensing device configured to sense
first information relating to an operation amount of the operating member, and
second information relating to an operating force of the operating member; and
an adjusting device configured to adjust a position of the at least one friction member based on the first information and the second information, wherein the adjusting device includes
an actuator configured to actuate the braking device to move the at least one friction member, and
an adjustment controller configured to control the actuator to move the at least one friction member based on the first information and the second information,
the adjustment controller is configured to obtain a comparing value relating to a clearance between the at least one friction member and the movable member based on the first information and the second information,
the adjustment controller is configured to compare the comparing value with a reference value,
the adjustment controller is configured to control the actuator to move the at least one friction member based on a comparison between the comparing value and the reference value,
the adjustment controller is configured to store first to N1-th latest comparing values, wherein N1 is an integer equal to or larger than 2,
the adjustment controller is configured to calculate, as the comparing value, an average value of the first to N1-th latest comparing values, and
the adjustment controller is configured to control the actuator to adjust the clearance between the at least one friction member and the movable member in a case where the comparing value is larger than the reference value by a reference differential value or more.

18. A bicycle braking system comprising:
an operating device including an operating member configured to be operated by a user;
a braking device configured to apply a braking force to a movable member of a bicycle in response to an operation of the operating member, the braking device including at least one friction member configured to contact the movable member;
a sensing device configured to sense
first information relating to an operation amount of the operating member, and
second information relating to an operating force of the operating member; and
an adjusting device configured to adjust a position of the at least one friction member based on the first information and the second information, wherein
the adjusting device includes
an actuator configured to actuate the braking device to move the at least one friction member, and
an adjustment controller configured to control the actuator to move the at least one friction member based on the first information and the second information,
the adjustment controller is configured to obtain a comparing value relating to a clearance between the at least one friction member and the movable member based on the first information and the second information,
the adjustment controller is configured to compare the comparing value with a reference value,
the adjustment controller is configured to control the actuator to move the at least one friction member based on a comparison between the comparing value and the reference value, and
the adjustment controller is configured to obtain the reference value based on the first information and the second information in a setting mode.

19. The bicycle braking system according to claim 18, wherein
the adjustment controller is configured to store first to N2-th latest comparing values, in the setting mode, wherein N2 is an integer equal to or larger than 2, and
the adjustment controller is configured to calculate, as the reference value, an average value of the first to N2-th latest comparing values in the setting mode.

* * * * *